United States Patent
Fischel

[11] 3,758,952
[45] Sept. 18, 1973

[54] MERIDIAN GYROSCOPIC INSTRUMENT

[75] Inventor: Eduard Fischel, Uberlingen/Bodensee, Germany

[73] Assignee: Bodenseeiverk Geratetecknik GmbH, Uberlingen/Bodensee, Germany

[22] Filed: Feb. 22, 1971

[21] Appl. No.: 117,813

[52] U.S. Cl. .............................. 33/324, 33/275 G
[51] Int. Cl. ............................................ G01c 19/38
[58] Field of Search ............... 33/226, 72 G, 226 A; 74/5.4, 5.5

[56] References Cited
UNITED STATES PATENTS

| | | | |
|---|---|---|---|
| 2,976,618 | 3/1961 | Campbell et al. | 33/226 R |
| 3,512,264 | 5/1970 | Ambrosini | 33/226 R |
| 3,250,136 | 5/1966 | Miller | 33/226 R X |
| 3,258,976 | 7/1966 | Krupick et al. | 33/226 R UX |
| 3,619,905 | 11/1971 | Stier | 74/5.4 X |

FOREIGN PATENTS OR APPLICATIONS

| | | | |
|---|---|---|---|
| 1,313,156 | 11/1962 | France | 33/226 R |
| 1,230,574 | 12/1966 | Germany | 33/226 R |

*Primary Examiner*—Robert B. Hull
*Attorney*—Darbo, Robertson & Vandenburgh

[57] ABSTRACT

The damping device for a meridian gyroscope includes a torque motor between the gyro rotor housing and the frame from which the gyro is suspended by a tape. The torque motor is supplied with electric signals derived by a pickoff between the gyro rotor housing and the frame and applies a torque to the gyro rotor housing about an axis that is perpendicular to a plane which includes the tape and the gyro spin axis.

5 Claims, 5 Drawing Figures

INVENTOR
EDUARD FISCHEL
BY
Darby, Robertson &
Vandenburgh

MERIDIAN GYROSCOPIC INSTRUMENT

BACKGROUND AND SUMMARY OF THE INVENTION

This invention relates to a meridian gyroscopic instrument comprising a tape-suspended gyro rotor case and an electric damping device for damping azimuth oscillations of the gyro rotor case, including a pickoff acting about the azimuth axis.

For quick determination of north it would be desirable if the azimuth oscillations of the meridian gyro rotor case could be damped aperiodically. Efforts to achieve this have included immersing the gyro rotor case pendulously in liquids of sufficient viscosity. However, this involves errors since the gyro spin axis does not exactly assume the north position since the liquid finally causes a "stagnation" of the measuring system. It is also prior art to damp the oscillations by means of eddy currents, but this necessitates a large and heavy damping device. Moreover, it is necessary to magnetically shield the eddy current damping device, which is rendered extraordinarily difficult in a damping device of the type required for this purpose.

Prior art gyroscopic instruments for determining north include an apparatus which comprises a frame, a follow-up control means for the frame, and a gyroscopic assembly mounted in the frame. Said assembly includes an electrically drivable gyro rotor adapted to be spun about a horizontal gyro axis, and its case or housing is suspended from the frame by means of a tape suspension in such a manner that the gyro spin axis can be rotated about a vertical axis in dependence on the precession caused on account of the horizontal component of the angular velocity vector of the earth. The follow-up control means includes a sensor arranged between the gyroscopic assembly and the frame for generating an electric signal according to the sense and amount of rotation of the gyro spin axis about the vertical axis. In the prior art assembly the follow-up control means also includes a signal converter to convert the signal supplied by the sensor to an electric signal proportional to the velocity of azimuthal movement of the gyro spin axis about the vertical axis. A torque motor is connected to the output of the signal converter and is connected between the gyroscopic assembly and the frame to generate a torque about the vertical axis opposed to the angular velocity, in dependence on the signal proportional to the angular velocity of the azimuthal movement, which torque at least approximately reduces the angular velocity of the azimuthal movement to zero, when the north-south direction is assumed. See U.S. Pat. 3,512,264. In this case, a mechanical restraint of the gyroscopic assembly is effected by means of the torsioned tape suspension with relatively long periods of oscillation being obtained. The electric differentiation of such a slowly proceeding action is known to offer practical difficulties, since a weak signal with superimposed noise is produced which can hardly be used. A meridian gyro is prior art, in which the gyro is mounted in a rotor housing which is pivotably mounted in a first gimbal for movement about a horizontal axis perpendicular to the spin axis. This first gimbal is pivoted about a vertical axis in a second gimbal. A torque motor acts between the first and the second gimbals. This torque motor is controlled by a photo-electric pick-off on the second gimbal. This pick-off responds to pivoting movements of the rotor housing about the horizontal axis. Thus torques are exerted on the first gimbal about a vertical axis by the torque motor, by which torques the gyro spin axis is maintained in an orientation at a right angle to the plane of the first gimbal and therefore horizontal. If the gyro spin axis tends to deflect the first gimbal relative to the second gimbal, this deflection is detected by a second pick-off. This second pick-off controls a servomotor which causes the second gimbal to follow the gyro rotor housing, whereby eventually the second gimbal will be aligned with north. See French Pat. No. 1,313,156. In such an apparatus interfering torques are encountered by friction and the like. It is necessary to accurately vertically align the outer gimbal by special means.

It is an object of this invention to provide a meridian gyroscopic instrument which provides a quick indication of north.

It is another object of this invention to provide a meridian gyroscopic instrument having a short period of adjustment with automatic orientation towards north.

It is a more specific object of this invention, in a meridian gyroscopic instrument of the type indicated in the beginning, to attain a good damping of the azimuth oscillations, while avoiding the difficulties connected with an electric differentiation of a pickoff signal.

According to the invention this object is attained in that the pickoff is effective to generate a signal in response to the deflection of the gyro from its tape zero position (i.e. the position at which the tape forming the suspension is torsionally relaxed) and this signal is supplied to a torque motor (either proportionally and/or integrated). This torque motor (hereinafter called the damping torque motor) applies a torque to the gyro about an axis perpendicular to the plane which includes the tape and the gyro spin axis. Such a torque caused by the pickoff signal, about an axis (the $\beta$-axis) which is perpendicular to the plane of the tape and the gyro spin axis causes a torque about the tape axis due to the coupling of the gyro axes, which torque is proportional to the derivative of the pickoff displacement signal.

In an arrangement in which the pickoff signal is proportionally applied to a torque motor which creates a torque about the tape axis ($\alpha$ - axis) counteracting the gyro directional torque (hereinafter called the blocking torque motor), in which therefore an electric restraint of the gyro to its tape zero position is effected, a damping of the azimuth oscillations can be effected without the necessity of differentiating the pickoff signal by a proportional application of the pickoff signal to the damping torque motor. The electric restraint serves to increase the frequency. The restraint may be designed rigid to such an extent that the azimuthal deflection of the gyro spin axis from the tape zero position is negligible. The gyro directional torque is practically compensated by a torque applied by the blocking torque motor.

A similar restraining effect can be attained when applying the pickoff signal, after intergration, to the damping torque motor. The application of the integrated signal to the damping torque motor has the advantage that in the steady state of oscillation a residual error about the $\beta$ - axis does not falsify the azimuthal adjustment of the gyro.

Finally, the pickoff signal can also effect a return to null position through a servomotor, i.e. rotate the gyro together with its suspension to follow north. In such an arrangement with zero balancing, a "restraining torque" about the $\alpha$ - axis, i.e. in azimuth, has a damping effect on the transient movement towards north as can be shown mathematically. Such a restraining torque can also be attained by applying the time integral of the pickoff signal to the damping torque motor.

DESCRIPTION OF SPECIFIC EMBODIMENTS

Figure 1:
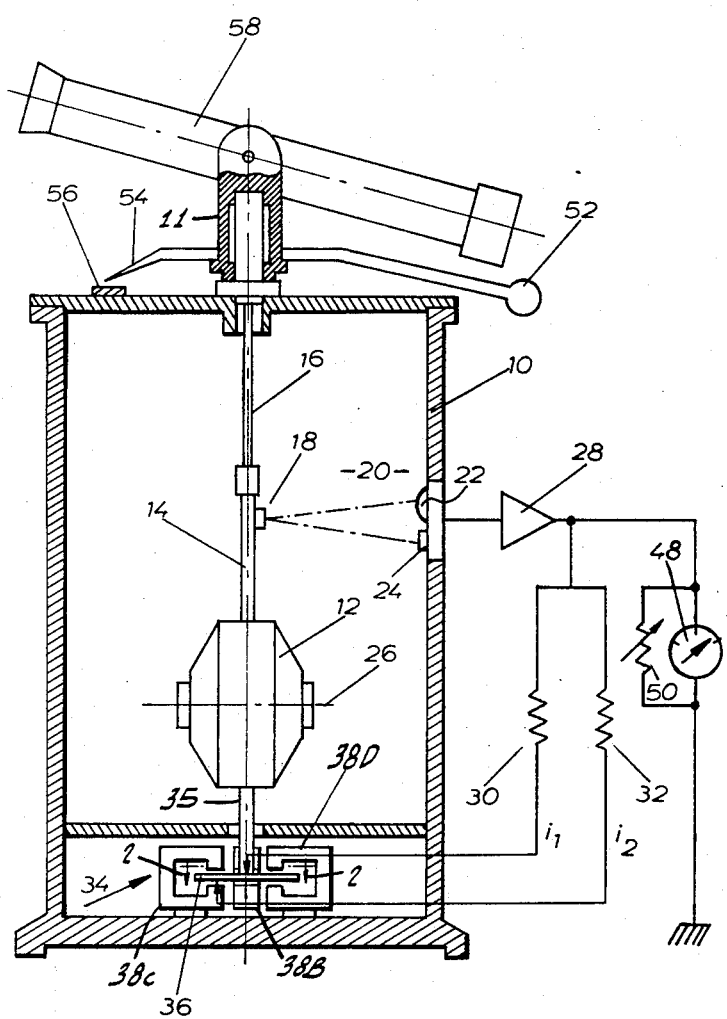
FIG. 1 is a schematic illustration in a longitudinal section of an embodiment of the invention with compensation of the gyro directional torque and includes a schematical illustration of the electric circuit.

In FIG. 1 reference numeral 10 designates a frame or housing in which a gyro rotor housing 12 is suspended from a tape 16. The tape is suspended from a turret 11 and is attached to a stem 14 forming a part of the rotor housing 12. A mirror 18 is mounted on the stem 14. The mirror 18 forms part of a photoelectric pickoff 20 which additionally includes a light source 22 and a photoelectric detector device 24. The pickoff supplies an output signal in response to the deflection of the gyro spin axis 26 from the position at which the tape is torsionally relaxed. Pickoff 20 supplies an output signal which is delivered to a torque motor generally indicated at 34 (the damping torque motor) by a connecting means comprising amplifier 28 and resistors 30, 32. From the amplifier the output signal is divided into two current signals $i_1$ and $i_2$ which are proportional to the signals from the pickoff. The torque motor includes a flat armature 36 and field magnets 38A, 38B, 38C and 38D. Armature 36 is suspended from the rotor housing 12 by a shaft 35.

Figure 2:
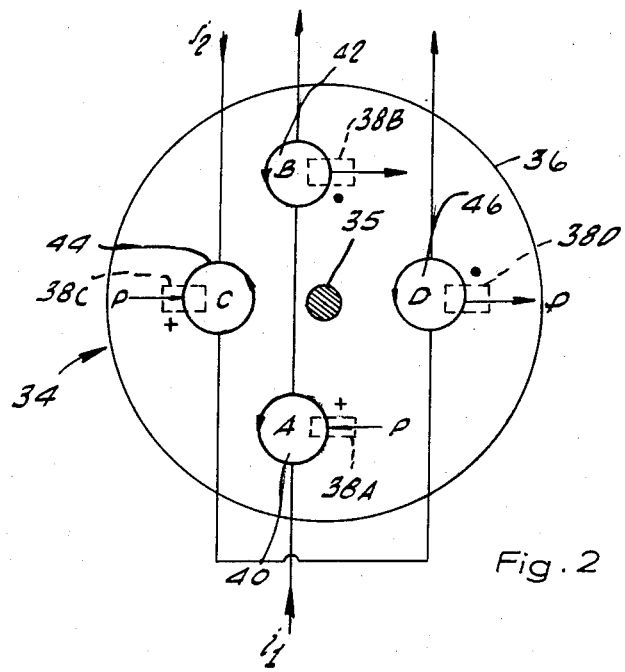
FIG. 2 is a section as seen at line 2—2 of FIG. 1, but in diagrammatic form, and illustrates the operation of the damping and blocking torque motors.

The assembly of the torque motor 34 can best be seen from the schematic diagram of FIG. 2. It comprises two pairs of magnetic circuits of which pairs A,B and C,D are shown in section with the polarity indicated in FIG. 2. Herein + signifies that the magnetic flux is downward into the plane of the paper, and that the magnetic flux is upward from the plane of the paper. Moreover, the armature 36 has coil pairs comprised of the coils 40, 42 and 44, 46. The coils are flat, lying substantially in the plane of the armature. The currents $i_1$ and $i_2$ flow through the coil pairs respectively in the sense indicated by the arrows in FIG. 2. The current $i_1$ flows through the coils 40 and 42 and the current $i_2$ through the coils 44 and 46 resulting in the forces P indicated in FIG. 2. A resultant thrust of the value 2P from the left rightwardly in FIG. 2 and a clockwise torque of the value $P \cdot 2r$ are obtained, if 2r is the spacing between the coils 40, 42. The resultant thrust 2P due to current $i_2$ in coils 44 and 46 acts to produce a torque about an axis (the $\beta$ - axis) which extends perpendicularly to the plane of the tape axis and the gyro spin axis 26. This is the damping torque motor.

The current $i_1$ through the coils 40 and 42 creates a torque $P \cdot 2r$ about the tape axis. The torque about the tape axis counteracts the gyro directional torque and it applies a restraining force to the gyro 12 electrically urging it to remain at the tape zero position. This is the blocking torque motor. The gyro directional torque is practically compensated by the electric countertorque. Then, the pickoff signal at the pickoff 20 is proportional to the gyro directional torque and therewith proportional to the azimuthal offset $\alpha_o$. The amplifier 28 is wired to the detector device 24. Wires connect the output of the amplifier to an indicating instrument 48, variable resistor 50, resistor 30, and resistor 32. The pickoff signal is indicated at the indicating instrument 48. An adjustable resistor 50 is in parallel with the indicating instrument 48 and is adjustable in accordance with cos $\phi$ ($\phi$ = latitude) to allow for the latitude; thus, the offset angle $\alpha_o$ can be read directly at the indicating instrument 48. This angle $\alpha_o$ can then be manually adjusted by means of a handle 52 with a pointer 54 on a scale 56 (compass card). Handle 52 is coupled to turret 11 so that the handle movement rotates the turret about a vertical axis; which, in turn, rotates the tape 16 and the gyro housing 12. A telescope 58 is connected to the pointer 54. With an adjustment of the angle the telescope 58 then points towards north.

In this arrangement the gyro 12 is stiffly restrained to the tape zero position so that a relatively high frequency of the azimuth oscillations is obtained. In order to damp these azimuth oscillations, the current $i_2$ is supplied to the coils 44, 46. The torque thus acting about the $\beta$ - axis also, through the coupling of the axis by the gyro 12, acts about the tape axis 16, thus supplying a damping force.

Figure 3:
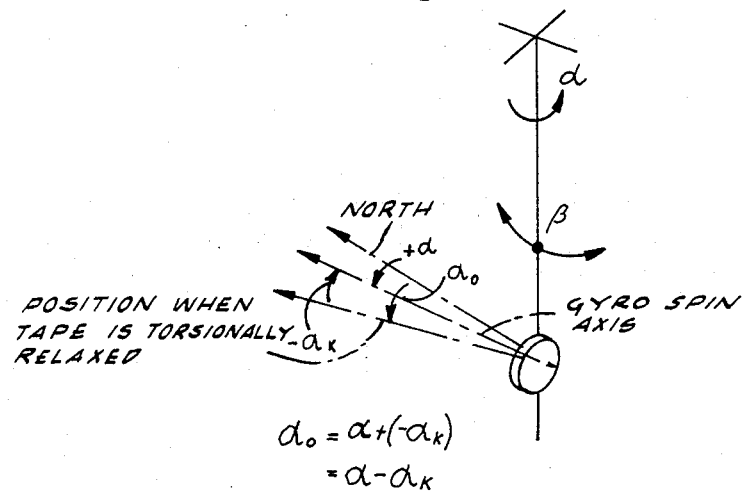
FIG. 3 illustrates the angle relations.

The arrangement hereinbefore described effects a damping of the azimuthal oscillations; this shall be elucidated hereinafter by reference to FIG. 3.

When denominating with $\alpha$- the angle of the azimuthal oscillation (offset of the gyro spin axis from north)

$\alpha_k$- the angle between the spin axis and the tape zero torsion position $\alpha_o$- the angle of the tape zero position from north (initial error angle of the apparatus from north)

$\beta$- the angle of the oscillation of elevation $H$- the angular momentum of the gyro $C_\alpha$ - the spring constant of the tape suspension $K$- the pendulum torque $D$- the factor for multiplying the pickoff signal to give the resulting torque applied by the torque motor about the tape axis $\phi$- the latitude $HW_e$ Cos $\phi$-$\alpha$-the gyro north torque $HW_e$ Sin $\phi$- the elevation torque then the following applies, in case no interference from without is assumed:

for the sum of the torques about the $\alpha$ - axis $$HW_e \text{ Cos } \phi \cdot \alpha + C_\alpha \cdot \alpha_k + H \dot{\beta} = 0$$

and for the sum of the torques about the $\beta$ - axis $$K \beta - H\dot{\alpha} - D\alpha_k - HW_e \text{ Sin } \phi = 0$$

From this geometry the following is obtained:

$$\alpha_o = \alpha - \alpha_k$$

When solving the equation for $\alpha_k$, by equating $\alpha = \alpha_o + \alpha_k$ then the following equation is obtained:

$$H^2/K \ddot{\alpha}_k + HD/K \cdot \dot{\alpha}_k + (HW_e \text{ Cos } \phi + C_\alpha) \alpha_k = - HW_e \text{ Cos } \phi \, \alpha_o$$

From this equation it can be seen that the intended factor expressed by the coefficient D, appears in the term of the derivative of $\alpha_k$ and thus produces the damping effect. If the $\alpha_k$ - oscillation is damped, the $\alpha$ - oscillation is also damped, as it is connected with the same by the equation $\alpha = \alpha_o + \alpha_k$. Of course, the damping does not influence the angle $\alpha_o$, which must be caused to assume zero by other means. Moreover, it can be noted that the constant elevation torque $HW_e \sin \phi$ does not enter into the equation for $\alpha$. From this it can be concluded that a possible faulty residual torque of $D\alpha_k$ also will not appear and thus does not have any influence on the north accuracy of the apparatus.

Figure 4:
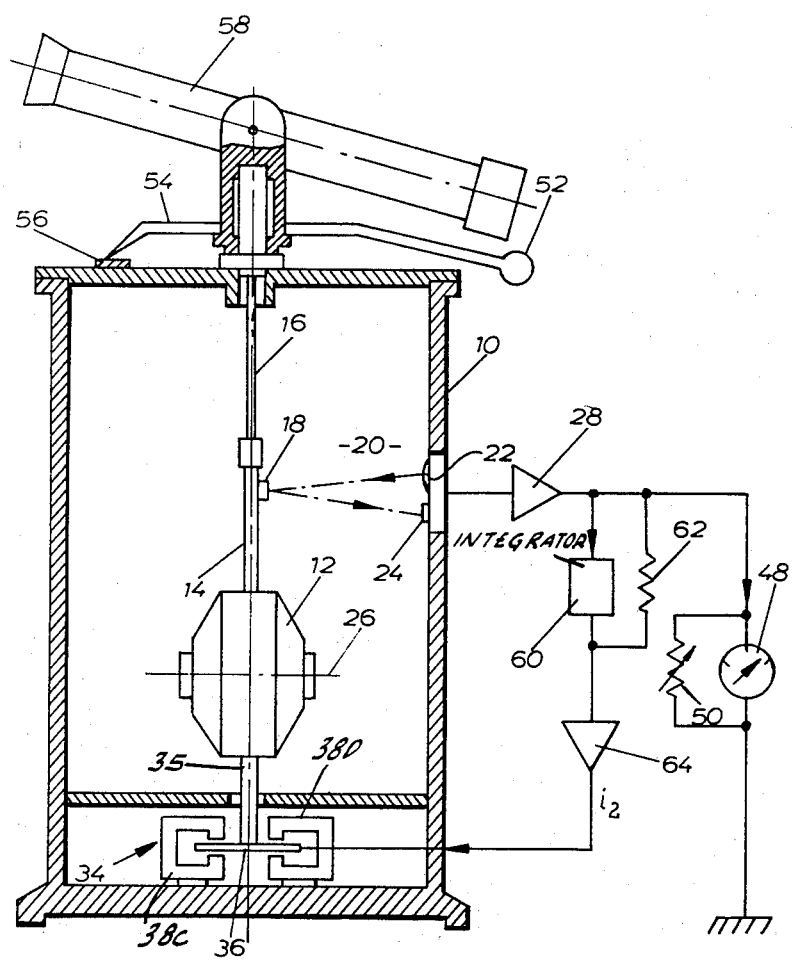
FIG. 4 is an illustration similar to FIG. 1 showing another embodiment of the invention.

FIG. 4 illustrates a modified embodied form. Like parts in FIG. 4 are denoted by the same reference numerals as in FIG. 1. In this embodiment the torque motor arrangement includes only the magnetic circuits C, D of FIG. 2; that is, the damping torque motor without the blocking torque motor. The flat armature 36 on the gyro 12 accordingly only has the coils 44, 46 through which the current $i_2$ flows. Therefore, the torque motor creates a torque about the $\beta$ - axis.

The output signal of the pickoff 20 is applied to the motor 34, as so modified, through a connecting means comprising amplifier 28, an integrator 60 having a resistor 62 in parallel therewith, and a power amplifier 64. The application of the integrated pickoff signal to the damping torque motor acting about the $\beta$ - axis, according to the above considerations has the effect of a restraint of the gyro to the zero position about the $\alpha$ - axis. The proportional application of the pickoff signal through the resistor 62 effects a damping. Thus, the arrangement according to FIG. 4 functions similarly to the arrangement according to FIG. 1. However, only a torque motor acting about the $\beta$ - axis is required. Moreover, possible residual errors do not have any effect on the torque motor in the azimuth adjustment.

Figure 5:
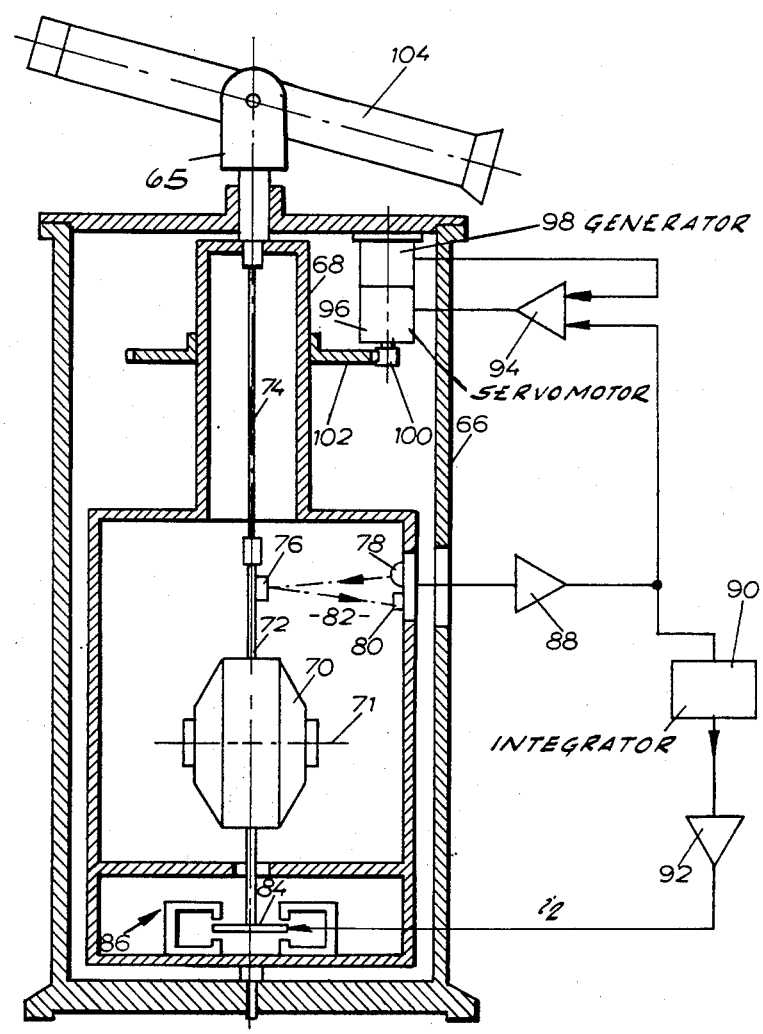
FIG. 5 illustrates a third embodiment of the invention.

FIG. 5 illustrates an arrangement with automatic nulling to zero. An intermediate frame 68 is supported by a turret 65 in a main frame 66 for rotation about a vertical axis. A gyro rotor housing 70 having a stem 72 is suspended in the intermediate housing by a tape 74. The upper end of tape 64 is secured to turret 65. The stem 72, as in the other embodiments, carries a mirror 76 which, together with a light source 78 and a photoelectric detector arrangement 80, constitutes a photoelectric pickoff 82. An armature 84 of a torque motor 86 is connected with gyro 70. The motor stator is affixed to an intermediate frame 68. The armature 84 is a flat armature having coils 44, 46 arranged in magnetic circuits C, D (FIG. 2). A current $i_2$ is applied to the coils. The torque motor therefore creates a torque about the $\beta$ - axis. The current $i_2$ is derived from the pickoff signal of the pickoff 82 through a preamplifier 88, an electric integrator 90 and a power amplifier 92. The pickoff signal amplified through the preamplifier 88 is also applied to a servomotor 96 through a servoamplifier 94. A tachometer generator 98 coupled with the servomotor 96 supplies a velocity feedback to the amplifier 94 and servomotor 96. A pinion 100 on the shaft of the servomotor 96 meshes with a gear wheel 102 on the inner frame 68. Therefore, the inner frame 68 is rotated relative to the outer frame 66 by the servomotor 96. A telescope 104 is secured to turret 65 and thus is coupled with the inner frame 68.

If the gyro spin axis 71 deviates from north, a directional torque acts on the gyro 70. This torque causes a deflection of the gyro 70 with respect to the frame 68 and generates a corresponding pickoff signal at the pickoff 82. The pickoff signal is applied to the servomotor 96 through the amplifier 94 so that the movable frame 68, with the gyro 70, is rotated towards north. In the final state the gyro 70 with its tape torsionally relaxed has its spin axis 71 pointing north.

The pickoff signal integrated by the integrator 90 is then applied to the damping torque motor 86 acting about the $\beta$ - axis, so that this signal when differentiated produces an effect about the $\alpha$ - axis. Such a signal represents a damping of the movement of the gyro 70 towards north.

I claim:

1. In a meridian gyroscopic instrument comprising a frame, a gyro having a gyro rotor casing, a tape having one end secured to the frame end the other end secured to the gyro rotor casing and suspending the gyro from said frame, said gyro having a spin axis, an electric damping device between the gyro and the frame for damping azimuth oscillations of the gyro, said device including pickoff means acting about the azimuth axis for generating a signal in response to the deflection of the gyro from its zero tape position, the improvement wherein said damping device comprises:

torque motor means connecting the gyro and the frame for applying, in response to signals to the motor means, a torque to the gyro about an axis perpendicular to a plane which includes the tape and the gyro vector axis; means connecting said motor means and said pickoff means for receiving said signals from the pickoff means and supplying signals to the motor means in response to the received signals.

2. In an instrument as set forth in claim 1, said damping device including second torque motor means operatively connected to said gyro rotor casing to produce, when signals are supplied thereto, a torque on the gyro rotor casing about the tape axis counteracting the gyro directional torque, said connecting means being connected to said second motor means and supplying both motor means with signals which are proportional to the signals from the pickoff means.

3. In an instrument as set forth in claim 1, the further improvement wherein said connecting means integrates the signals from the pickoff means before supplying the signals to the motor means.

4. In an instrument as set forth in claim 3, the further improvement wherein said connecting means, in addition to producing integrated signals, also supplies signals to the motor means which are proportional to the signals from the pickoff means.

5. In an instrument as set forth in claim 1, the further improvement wherein said housing is mounted for rotation about the axis of the tape, said connecting means integrating the signals from the pickoff means before supplying the signals to the motor means.

* * * * *

UNITED STATES PATENT OFFICE
CERTIFICATE OF CORRECTION

Patent No. 3,758,952          Dated September 18, 1973

Inventor(s)   Eduard Fischel

It is certified that error appears in the above-identified patent and that said Letters Patent are hereby corrected as shown below:

| | |
|---|---|
| Assignee: | "Bodenseeiverk Geratetecknik" should be "Bodenseewerk Geratetechnik" |
| Col. 2, line 58 | "intergration" should be "integration" |
| Col. 3, line 46 | after "and" insert a period. |
| Col. 3, line 58 | after "P" insert a period. |
| Col. 3, line 65 | after "P" insert a period. |
| Col. 4, line 21 | "then points towards" should be "then exactly points towards" |

Signed and sealed this 21st day of May 1974.

(SEAL)
Attest:

EDWARD M. FLETCHER, JR.
Attesting Officer

C. MARSHALL DANN
Commissioner of Patents